Figure 5:
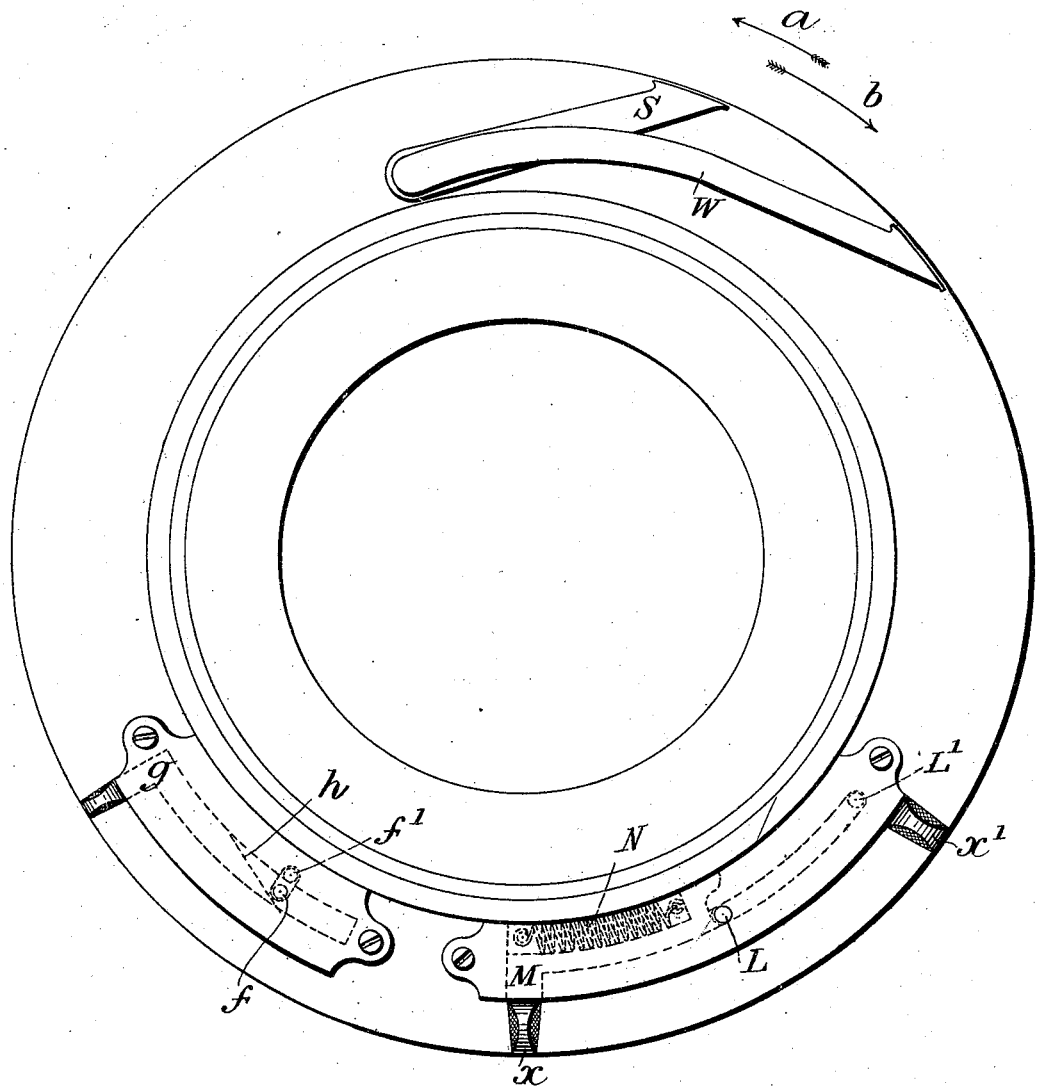

No. 689,982. Patented Dec. 31, 1901.
W. H. MORGAN.
PHOTOGRAPHIC SHUTTER.
(Application filed Feb. 21, 1901.)
(Model.) 3 Sheets—Sheet 1.
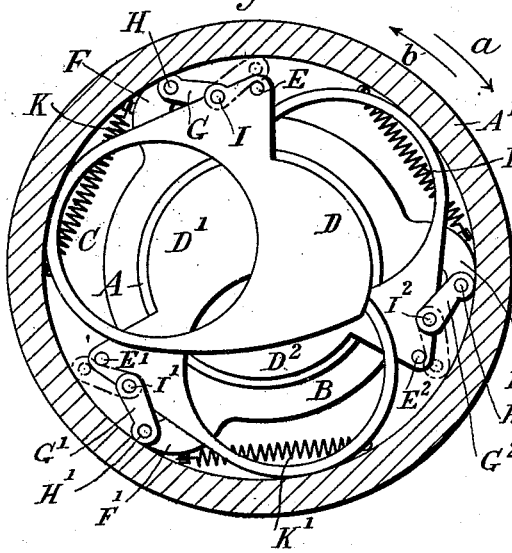
Fig. 1.
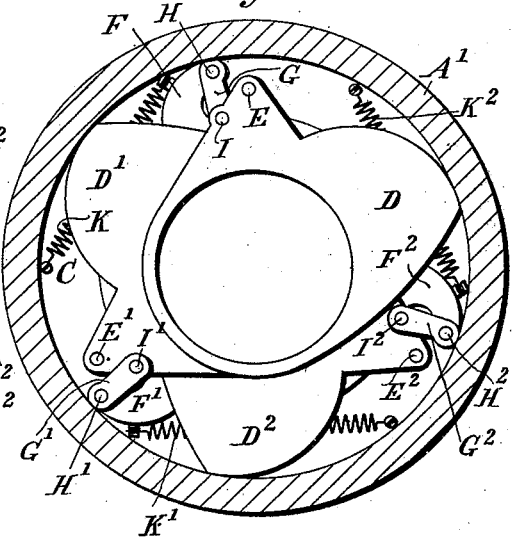
Fig. 2.
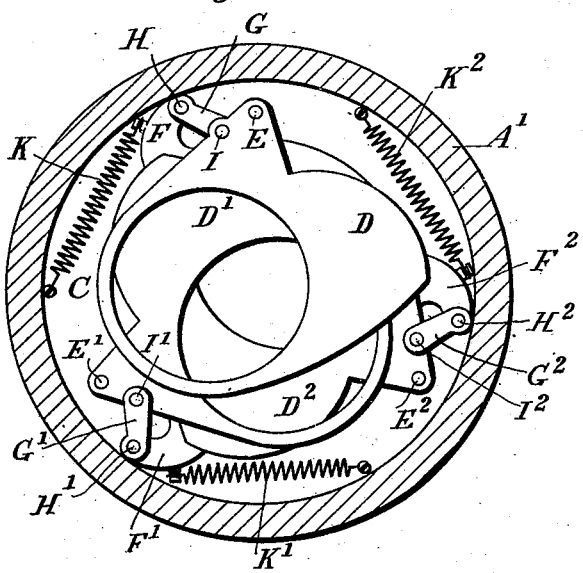
Fig. 3.
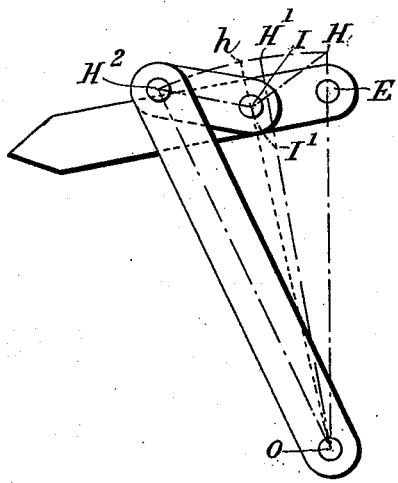
Fig. 6.
WITNESSES:
Fred White
Thomas F. Wallace
INVENTOR
William Howard Morgan,
By his Attorneys:
THE NORRIS PETERS CO., PHOTO-LITHO., WASHINGTON, D. C.

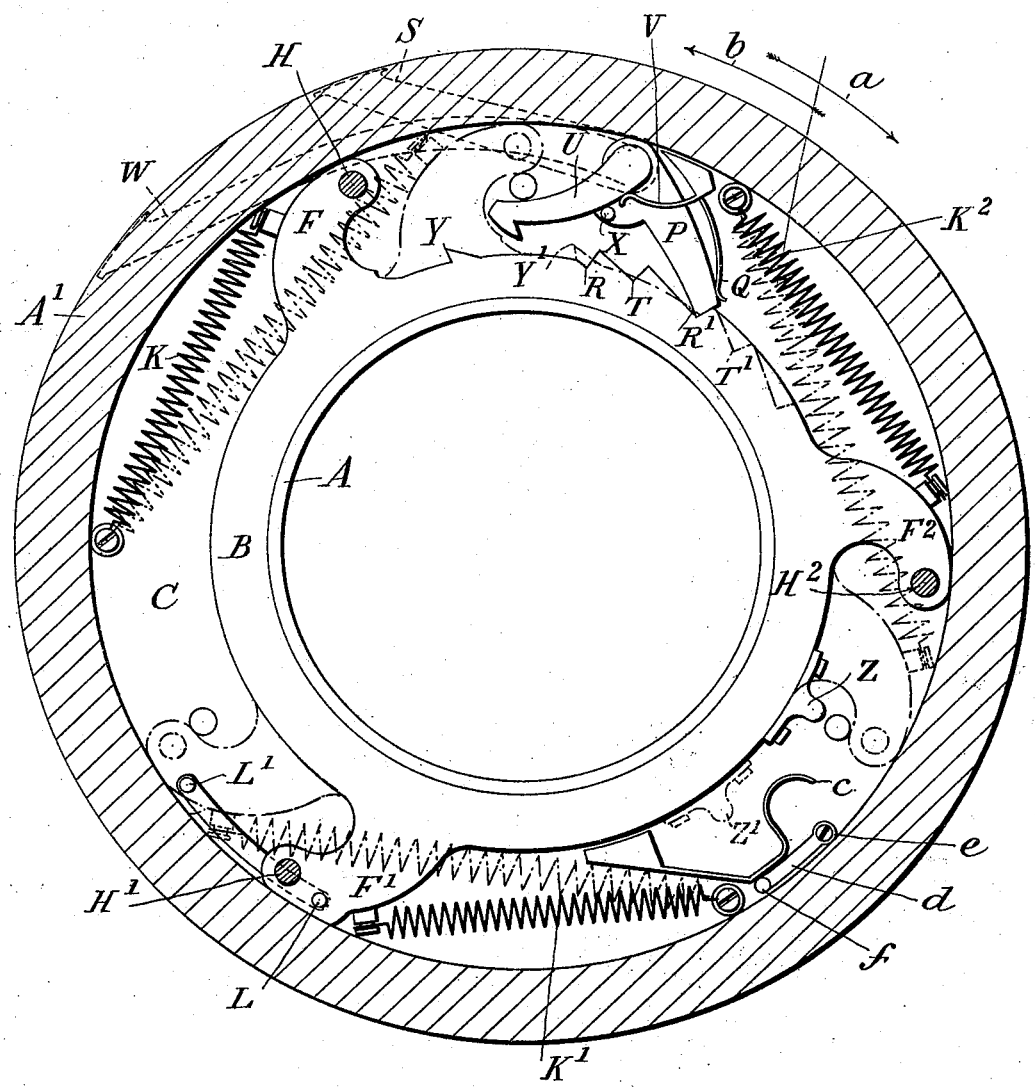

No. 689,982. Patented Dec. 31, 1901.
W. H. MORGAN.
PHOTOGRAPHIC SHUTTER.
(Application filed Feb. 21, 1901.)

(Model.) 3 Sheets—Sheet 3.

WITNESSES:
Fred White
Thomas F. Wallace

INVENTOR:
William Howard Morgan,
By his Attorneys:

UNITED STATES PATENT OFFICE.

WILLIAM HOWARD MORGAN, OF GUILDFORD, ENGLAND.

PHOTOGRAPHIC SHUTTER.

SPECIFICATION forming part of Letters Patent No. 689,982, dated December 31, 1901.

Application filed February 21, 1901. Serial No. 48,230. (Model.)

*To all whom it may concern:*

Be it known that I, WILLIAM HOWARD MORGAN, esquire, of Shere, Guildford, in the county of Surrey, England, have invented certain new and useful Improvements in Photographic Shutters, of which the following is a specification.

This invention has reference to photographic shutters; and its main object is to provide a simple and efficient shutter which will effect an exposure of the shortest possible duration, but shall nevertheless effect a full and complete exposure.

In the majority of instantaneous shutters the motion of the shutter is uniform, the result being that there is a gradual shutting off of the light. According to this invention a differential motion of the shutter is produced immediately after (and also before) the required exposure takes place. This differential motion is produced by interposing a link or links between the actuating-plate and the parts which cause the exposure. According to this invention the movement of the shutter is so adjusted that its motion is retarded at or toward the point of full exposure and is accelerated up to the point of complete closure. This is effected by the employment of an actuating-plate and a shutter plate or plates in combination with a link or links.

Any suitable mechanism for setting and releasing the shutter may be used. By way of example, the actuating-plate may be partially rotated by a suitable finger-piece against the tension of a spring or springs until a suitably-arranged stop or catch engages a notch in the actuating-plate. On this stop being released the actuating-plate is released and its spring or springs cause it to fly back and actuate the shutter plate or plates. If it be desired to employ the shutter for time or lengthened exposures, this may be effected, for example, by providing an intermediate notch in the setting mechanism, this notch being so situated that when the actuating-plate has been released or moved to the point of full exposure a suitable stop or catch will engage the intermediate notch and retain the parts in this position, from which it can be released to close the shutter by any suitable means. For slow instantaneous exposures a suitable brake or brakes may be employed to retard the motion of the mechanism at the instant of open aperture only, thus leaving the times occupied in opening and closing unaltered.

Referring to the accompanying drawings, Figure 1 is a vertical section through the lens-mount of a photographic camera, showing in front elevation a photographic shutter embodying this invention in the position of complete closure, the setting and releasing mechanisms being omitted for the sake of clearness. Fig. 2 is a similar view showing the shutter in the position of complete exposure. Fig. 3 is a similar view showing the shutter in an intermediate position after exposure; and Fig. 4 is a vertical section through the lens-mount, illustrating the setting and releasing mechanisms in front elevation and showing only the actuating-plate in the position of complete closure, the shutter-plate and links being omitted for the sake of clearness. Fig. 5 is a rear elevation of the lens-mount. Fig. 6 is a diagram illustrating the motion of a shutter-plate. Figs. 4, 5, and 6 are drawn to a larger scale than Figs. 1, 2, and 3 for the sake of clearness.

A A' indicate, respectively, the inner and outer concentric parts of the lens-mount.

B is the actuating-plate of annular form located in the annular space C between the parts A A' and adapted to revolve around the part A through an arc sufficient to enable it to open and close the shutter-plates, as hereinafter described.

Any suitable number of shutter-plates may be employed. One only will suffice; but it is preferred to employ three shutter-plates D D' $D^2$, as indicated in the embodiment of this invention shown in the figures. The shutter-plates D D' $D^2$ are pivoted to the lens-mount by means of pins E E' $E^2$, respectively. The actuating-plate B is provided with as many arms as there are shutter-plates. In the present case, where three shutter-plates D D' $D^2$ are employed, the plate B is provided with three arms F F' $F^2$.

G G' $G^2$ are links connecting, respectively, pins H H' $H^2$, carried by the arms of the actuating-plate, with pins I I' $I^2$, which are riveted into the links and work in holes in the shutter-plates.

K K' $K^2$ are coiled springs connecting the arms F F' F² of the actuating-plate to the lens-mount. These springs serve to rotate the actuating-plate in order to produce the desired exposure when the actuating-plate B is released. The relative radial lengths of the several parts should be such that when each of the links G G' G² coincides in position with a radius drawn from the axis of the lens or lens-mount the shutter will be fully open to give the required exposure. The radius of the path of the actuating-pins H H' H² may be greater or equal to or less than the distance of the shutter-plate pivots E E' E² from the axis of the lens. In the drawings it is shown greater.

The operation of the shutter is as follows: In the position of the parts shown in full lines in Fig. 1 the shutter is completely closed, but not set, and the springs K K' K² have only sufficient tension to keep the shutter securely closed. To set the shutter, the actuating-plate B is rotated by hand, by means of the setting mechanism hereinafter described, against the tension of the springs K K' K² in the direction of the arrow $a$ until the links G G' G² have assumed the position shown in dotted lines in Fig. 1. The shutter is now set and is retained in this position by the ratchet-and-pawl mechanism hereinafter described. On releasing the actuating-plate B by means of the releasing mechanism hereinafter described the plate B is caused by its springs K K' K² to move around in the direction of the arrow $b$, Fig. 1. In this movement the pins I I' I² first move toward the axis of the lens, so that when the shutter-plates D D' D² first commence to open under the action of the actuating-plate B and links G G' G² they move more rapidly than the actuating-plate, but with retarded motion, up to or at the point of full exposure, when the links G G' G² will have assumed a radial position with relation to the axis of the lens, as shown in Fig. 2. The point of complete exposure has now been reached and the shutter-plates D D' D² are for an instant motionless. The actuating-plate B continuing its motion the links G G' G² now move the shutter-plates D D' D² in the reverse direction—i. e., away from the axis of the lens—with an accelerated closing motion and in a somewhat similar way as the velocity diminished in the opening motion.

The mechanism for setting the shutter is illustrated in Fig. 4, in which the actuating-plate B is shown in full lines in the position which it occupies when the shutter is completely closed, but not set, and in dotted lines when the shutter is set. In one of the arms of the actuating-plate B—for instance, the arm F'—a pin L is inserted and projects backward through the lens-mount. M, Fig. 5, is a spring-bolt which is operated by pinching together the handles or finger-pieces $x$ $x'$, of which $x'$ is a fixture. The pin L is moved into the position L', Fig. 4, by means of the spring-bolt M, carrying the actuating-plate with it, and so setting the shutter. When released, the spring-bolt is returned to its original position by a spring N. By this means there is no external movement of the parts during exposure, thus obviating the possibility of the exposure being unintentionally prolonged by the movement of the actuating-plate B being accidentally impeded. Fig. 4 also illustrates the releasing mechanism. When the shutter is set, a pawl P, actuated by a spring Q, falls into a notch R'. To this pawl a lever S is rigidly attached, and by depressing this lever S the actuating-plate B is released and an instantaneous exposure made.

T is a notch for holding the shutter open for focusing purposes.

Mounted on an axis passing through the pawl P is a second pawl U, kept clear of the actuating-plate by means of a spring V. To this second pawl is rigidly attached a lever W. When it is required to make a prolonged exposure, the lever W is depressed, carrying with it the pawl U, and by means of the pin X also the pawl P. The mechanism is so arranged that prior to the pawl P leaving the notch R' the pawl U will have moved into the path of a tooth Y (formed on the actuating-plate B) and now occupying the position indicated in dotted lines at Y', so that when the actuating-plate is actually released its progress is arrested by the pawl U engaging the tooth Y, which occurs when the shutter is fully open. The shutter can be held in this position as long as may be desired, and on releasing the lever W the shutter closes.

By the above means it is not necessary to make any preliminary setting for a time exposure. The shutter is set in the same way for all exposures. For an instantaneous exposure the lever S is depressed and for a time exposure the lever W.

For the purpose of braking the motion of the shutter for slow instantaneous exposures a cheek Z is attached to the actuating-plate at any convenient point, and a spring $c$ is arranged at such a point that this cheek shall pass it at open aperture. This spring $c$ rests against a short lever $d$, pivoted at $e$ and furnished with a pin $f$, passing backward through the lens-mount and capable of movement from $f$ to $f'$. This movement can be imparted to it by pushing the bolt $g$, the sloping face $h$ of which forces the pin $f$ inward, into the position $f'$, and thereby forcing the spring $c$ into the path of the cheek Z. The amount of the braking action can be regulated at will by moving the bolt $g$ to any desired extent. This bolt may be furnished with a graduated scale, as a means of indicating to what extent the exposure is prolonged by a given movement thereof. In the closing movement the shutter-plates D D' D² do not move with such a high angular velocity relatively to the actuating-plate B, since the actuating-plate B is moving more rapidly than it did when starting from rest. This serves to equalize the times occupied in opening and closing.

In the diagram, Fig. 6, $H\ H^2$ represent the path of the pin in the actuating-plate, the middle of this path being $h$. The actuating-pin and the end of the link attached thereto start from H, moving about the axis O of the lens. The other end of the link, attached to the shutter-plate, starts from I, moving about the center E. During opening the point I has to move through the arc I I' to the point I', in which position the link becomes radial and the shutter open; but to bring this about the point H has only to move to H' and not to $h$. During closing the point I has to move the same distance as during opening—namely, from I' to I; but to accomplish this the point H has to move from H' to $H^2$, which is about half as far again as it had to move during opening. Hence the shutter-plates do not move with so relatively a high (angular) velocity with respect to the actuating-plate during closing as during opening. The actual velocity is approximately the same during closing as opening, since the actuating-plate is moving at a higher velocity from H' to H'' than from H to H'. Shortly put, the case may stated as follows: The advantage due to the shorter distance (H to H') through which the actuating-plate B has to move in the opening movement is neutralized by the lower velocity of the plate B in starting from rest. Further, the advantage due to the higher velocity of the plate B during the closing movement (H' to H'') in consequence of its having acquired its full speed is neutralized by the greater distance through which it has to travel, so that the times of the opening and closing movements of the shutter are practically equalized. It is obvious that it is possible to produce the requisite movement of the shutter by having the operating-pins H H' $H^2$ fixed in the mount and the shutter-plate pivots E E' $E^2$ mounted on the actuating-plate.

What I claim, and desire to secure by Letters Patent, is—

1. In photographic-shutter mechanism, the combination of a shutter-plate, a link operating said shutter-plate and pivoted in such a position that said link is radial at full exposure, and a spring for operating said shutter-plate, substantially as set forth.

2. In photographic-shutter mechanism, the combination with a mount, of an actuating member adapted to be rotated concentrically to the axis of the lens, a spring adapted to rotate said actuating member, a shutter-plate actuated by said actuating member, and a link connected to said shutter-plate and pivoted in such a position that the link is radial at full exposure, substantially as set forth.

3. In photographic-shutter mechanism, the combination with a mount, of an actuating member adapted to be rotated concentrically to the axis of the lens, a spring adapted to rotate said actuating member, a shutter-plate pivoted to the mount, and a link connecting said shutter-plate to said actuating member, substantially as set forth.

4. In photographic-shutter mechanism, the combination with a lens-mount having inner and outer concentric portions of an actuating-plate located in the annular space between the said inner and outer portions of the lens-mount, and adapted to rotate on said inner portion of the lens-mount, and provided with an arm, a spring acting to rotate said actuating-plate, a shutter-plate pivoted to the lens-mount, and a link connecting pivotally said shutter-plate to the arm of said actuating-plate, substantially as set forth.

5. In photographic-shutter mechanism, the combination of a plurality of shutter-plates, a plurality of links each operating one of said shutter-plates, and pivoted in such positions that said links are radial at full exposure, and a spring operating one of said shutter-plates, substantially as set forth.

6. In photographic-shutter mechanism, the combination with a mount, of an actuating member adapted to be rotated concentrically to the axis of the lens, a spring adapted to rotate said actuating member, a plurality of shutter-plates pivoted to said mount, and a plurality of links each connecting a shutter-plate to said actuating member, substantially as set forth.

7. In photographic-shutter mechanism, the combination with a lens-mount having inner and outer concentric portions, of an actuating-plate located in the annular space between the said inner and outer portions of the lens-mount, and adapted to rotate on said inner portion of the lens-mount and provided with a plurality of arms equal in number to the number of shutter-plates, a spring adapted to rotate said actuating-plate, a plurality of shutter-plates pivoted to the lens-mount, and a plurality of links each connecting pivotally one of said shutter-plates to one arm of said actuating-plate, substantially as set forth.

In witness whereof I have hereunto signed my name in the presence of two subscribing witnesses.

WILLIAM HOWARD MORGAN.

Witnesses:
 GEORGE BELOE ELLIS,
 ROBERT MILTON SPEARPOINT.